United States Patent [19]

Chen et al.

[11] Patent Number: 5,684,934
[45] Date of Patent: Nov. 4, 1997

[54] PAGE REPOSITIONING FOR PRINT JOB RECOVERY

[75] Inventors: Weilin Chen; Edgar Lynn Johnson; David Franklin Pilcher; David Earl Stone, all of Longmont, Colo.

[73] Assignee: International Business Machines Corporation, Armonk, N.Y.

[21] Appl. No.: 429,407

[22] Filed: Apr. 26, 1995

[51] Int. Cl.[6] .................................................. G06F 15/00
[52] U.S. Cl. ............................................................ 395/113
[58] Field of Search ............................... 395/100, 101, 395/113, 117, 133, 375, 185.01, 185.02, 185.06, 185.1; 358/296, 405, 409, 450, 488; 355/205, 207; 400/188; 371/5.1, 40.2; 382/175, 180, 183, 184, 306, 309, 310, 311

[56] References Cited

U.S. PATENT DOCUMENTS

| | | | |
|---|---|---|---|
| 4,651,278 | 3/1987 | Herzog et al. | 395/117 |
| 4,745,602 | 5/1988 | Morrell | 395/181 |
| 5,027,154 | 6/1991 | Ujiie et al. | 355/205 |
| 5,107,299 | 4/1992 | Farrell et al. | 355/207 |
| 5,148,284 | 9/1992 | Nishikawa et al. | 358/296 |
| 5,179,410 | 1/1993 | Farrell et al. | 355/207 |
| 5,187,587 | 2/1993 | Farrell et al. | 358/296 |
| 5,220,674 | 6/1993 | Morgan et al. | 395/800 |

*Primary Examiner*—Leo Boudreau
*Assistant Examiner*—Gabriel I. Garcia
*Attorney, Agent, or Firm*—Holland and Hart

[57] ABSTRACT

A page repositioning process for error recovery and operator repositioning requests, that is incorporated into advanced function printers and that provides for sheet specific error and operator recovery capability in an N-up printing environment without the need for reprinting the whole job. Recovery is handled by interrupting the normal print stream and reprinting pages as necessitated by either the error or operator request and subsequently resuming the printing of the remainder of the print stream. Recovery is handled on a sheetside basis assuring that the integral relationship of a given page to a sheet is maintained during and after the recovery process.

5 Claims, 9 Drawing Sheets

PAGE REPOSITIONING FOR PRINT JOB RECOVERY

BACKGROUND OF THE INVENTION

1. Field of the Invention

This invention pertains to the field of information processing and more specifically to page repositioning processes for error recovery or in response to operator requests. More particularly, the invention relates to incorporating into advanced function printers logical operations or processes for print job error recovery or print job change requests to reposition printed pages in the print job.

2. Description of the Prior Art

Advanced function printers at a minimum consist of a data storage unit, a print system manager and a print engine. The data storage unit and the print system manager are functionally related by a document storage architecture of which MO:DCA, POSTSCRIPT, and LINE DATA are popular examples. The overall specifications for the first of these architectures, MO:DCA is set forth in IBM reference "*Data Stream and Object Architectures MIXED OBJECT DOCUMENT CONTENT ARCHITECTURE REFERENCE*" SC31-6802-02 June, 1993, which is herein incorporated by reference. The print system manager and print engine are functionally related by a bi-directional communication and control architecture of which the Intelligent Printer Data Stream (IPDS, a trademark of International Business Machines Corporation) is the most popular example. The overall architecture specifications are set forth in U.S. Pat. No. 4,651,278 and in IBM reference "*Data Stream and Object Architectures INTELLIGENT PRINTER DATA STREAM REFERENCE*" S544-3417-04, August 1993; herein incorporated by reference.

The print engines capable of interfacing with the IPDS data stream are capable of page outputs of 200 per minute. They are also capable of printing multiple pages on a single side of a sheet, in what is known as an N-up placement, where N can be the number of pages per sheet side. Software support for these all-points-addressable (APA) printers has lagged far behind the development of the print engines themselves. When for example, there is a print engine error, a paper jam for example, or when the operator issues a backspace/forward space command there is currently no recovery mechanism to assure that the correct page to sheet placement will be maintained. When a page reposition occurs, the page relationship on a sheet must be maintained. In other words, when a page is reprinted its accompanying pages on the sheet and their relative positions must remain the same. This is referred to as page relationship integrity. Error recovery at this point of development of the art may require printing a whole print job over particularly when multiple repositions occur (serially) during printing and their restarting points can 'overlap'. That is a reposition operation can cross the restarting point of a previous reposition. While the art has generally developed in a satisfactory manner to begin the exploitation of N-up technology a need remains for a printer system which allows error recovery without requiring the time and resource consuming method of reprinting a whole job.

SUMMARY OF THE INVENTION

This invention provides a printer system with an error and operator recovery method that does not require reprinting a whole job. Rather, error and operator recovery is handled by interrupting the normal print stream and reprinting pages as necessitated by either the error or operator request and subsequently resuming the printing of the remainder of the print stream.

The print system manager maintains a pending page queue which consists of pages recently sent to the print engine, in the order sent, as well as those pages next to be sent to the printer in the order to be sent. This queue is continually updated as each page is sent to the print engine. To ensure adequate page repositioning capability, in the event of error or operator recovery requests, specific records in the queue are tagged with a sidecount value. The sidecount value permanently designates the relationship between a given page and a given sheet side and is invariant no matter how many times the sheet is reprinted. In addition to the above mentioned features of the invention, it is also necessary that all error and operator-initiated recovery requests be interpreted as being sheetside rather than page specific, to ensure accurate repositioning. For example, when an operator makes a backspace "3" request, that request is interpreted as meaning that the last three sheet sides should be reprinted irregardless of the possibility that each sheet may consist of multiple pages of data.

The great advantage of this invention is that, in combination, the pending page queue, the sidecount tag, and the sheetside repositioning convention, provide an error or operator request recovery system that allows N-up printing systems to economically respond to recovery requests without the necessity for reprinting a whole print job. These and other features and advantages of the invention will be apparent to those of skill in the art upon reference to the following detailed description, which description makes reference to the drawings.

DESCRIPTION OF THE DRAWINGS

FIG. 5 shows the overall processing by which the print system manager retrieves MO:DCA files from the print spool, tags pages within those files, sends those pages to the pending page queue and the printer queue, and manages those queues in the event error recovery or operator recovery is called for.

DESCRIPTION OF PREFERRED EMBODIMENTS

Figure 1:
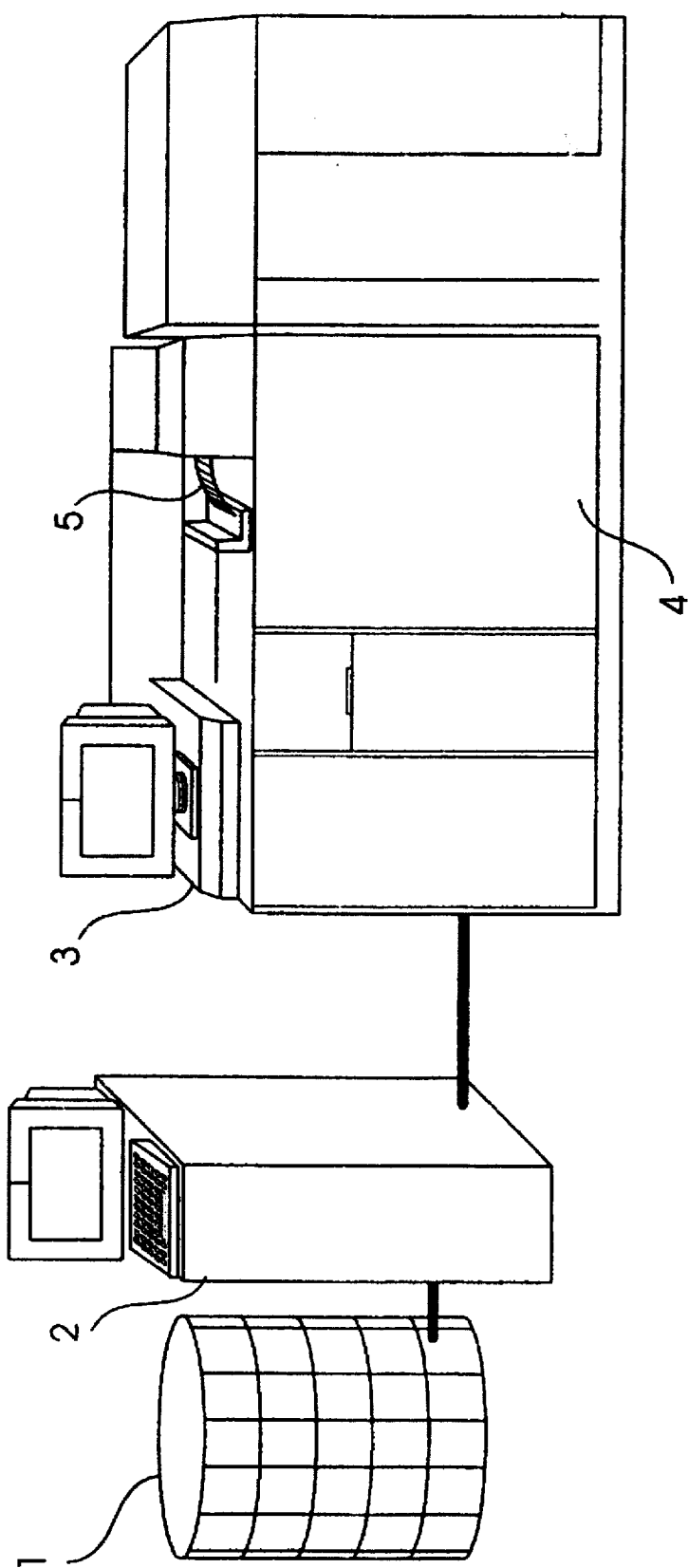
FIG. 1 is a diagram of print system hardware components.

FIG. 1 is diagram of print system components in accordance with a preferred embodiment of the invention, the system comprising an archive file or print spool 1 for the storage of a MO:DCA datastream. The datastream may consist of one or more files where each file is a document and several documents may comprise a print job. The datastream is accessed by the print system manager 2. To facilitate an understanding of the invention a Glossary of Terms is provided at the end of the Detailed Description of Preferred Embodiments.

The print system manager has four functions. First, it maintains a Pending Page Queue (PPQ) and a Printer Queue (PQ). Second, it transforms a MO:DCA datastream into an IPDS datastream. Third, it sends the resultant IPDS datastream to the printer controller 3. Fourth, it maintains constant bi-directional communication with the printer controller 3, and thereby manages the printer controller 3 during normal operation and during error recovery. This bi-directional communication capability provides communication for error recovery operation. The printer controller 3 in turn outputs bit mapped logical sheet images, where each logical sheet may consist of one or more logical pages, to the print system engine 4. The print system engine produces printed paper output 5.

Figure 2:
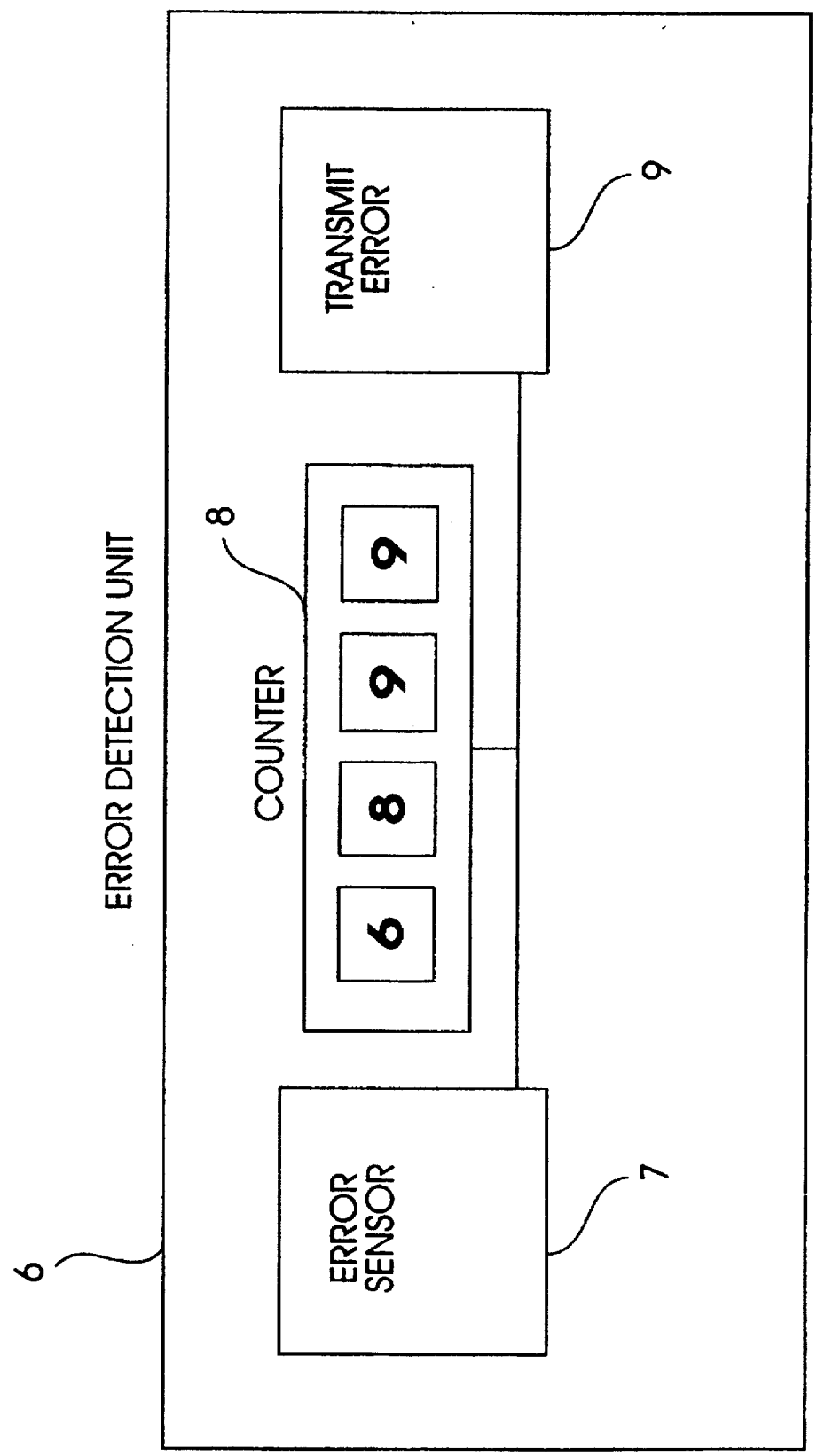
FIG. 2 is a diagram of an error detection unit.

In FIG. 2 the details of the error detection unit 6 is shown. The unit may be one of several similar units placed in the print stream. In operation a counter 8 upindexes with the passage of electronic or physical pages or sheets by that point in the printstream at which the error detection unit 6 is placed. If in the course of monitoring the printstream at that point there is an error, perhaps a jam of an electronic or mechanical nature, the error sensor 7 will detect that condition and report it to the transmission subunit 9. The transmission subunit will then signal the print system manager 2 and the clear printstream unit 37 in the printer controller 3 indicating that an error condition has been detected in the datastream. The signal sent by the transmission subunit will contain a location identifier and a counter value. The combination of location identifier and the counter value at that location, will allow the print system manager 2 and the clear printstream unit 37 to determine the extent of reprinting required, and to implement error recovery.

Figure 3:
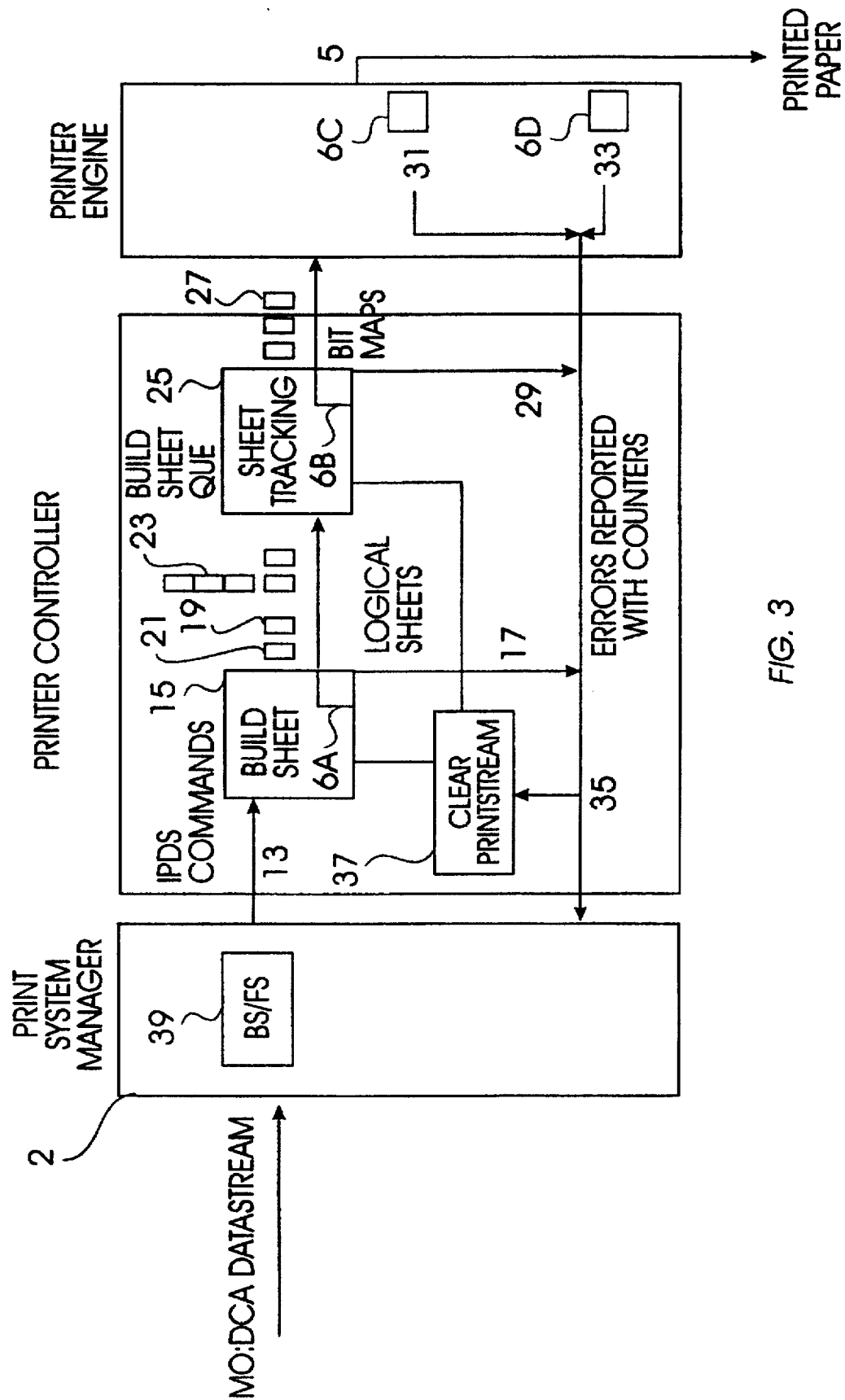
FIG. 3 is a diagram of the printer system showing the print system manager, printer controller, and printer engine.

In FIG. 3 the details of the printer controller 3 are shown. The MO:DCA datastream 11 consisting of one or more files is summoned by the print system manager 2. The print system manager 2 in turn transforms the MO:DCA datastream 11 into an IPDS datastream 13 which is sent to the build sheet module 15 of the printer controller 3. The build sheet module 15 analyzes the IPDS datastream and places the appropriate number of pages in the appropriate position on a logical sheet.

As each page of data is transferred by the IPDS datastream 13 to the build sheet module 15 the RPID counter of the build sheet error detection unit 6A, up increments. The output of the build sheet module 15 is in the form of logical sheets 19 and 21. These sheets are then placed in a build sheet queue 23. The build sheet queue is processed by the sheet tracking module 25 which operates to form a bit map stream 27 of logical sheets. As each logical sheet 27 exits the sheet tracking module 25 the committed page counter of the sheet tracking error detection unit 6B, up increments as each logical sheet begins its transformation into an actual sheet of data in the printer engine 4. The printer engine may be of the conventional type having print drum and feed rollers. Output 5 from the print engine consists of print sheets.

Instrumental in the error recovery capability of the printer are the error detection capabilities of the printer controller, and printer engine. Four error detection points are shown in FIG. 3 each with their own detector, counter and reporting capability. Two of these, the build sheet error detection unit 6A and the sheet tracking error detection unit 6B are located in the printer controller. In addition the printer has the capability of reporting paper jams at one or more points internal to the printer engine, where each jam reporting point 6C and 6D detects datastream processing errors, such as paper jams. Not shown, but equally possible, is the extension of error detection capability to any post processing functions such as stapling and collation with which the printer may be provided. The counter portions of all error detection units up increment as each page of data, either electronically or physically represented, is received.

When an error is detected at any one of the following error detection units 6A, 6B, 6C, 6D, the detecting unit transmits a signal 17, 29, 31, 33 containing location information and counter value. This location and count becomes part of a more general error feedback signal 35 which is passed to the print system manager 2 and clear printstream unit 37. Error detection information consists of: the point at which the error occurred, and the counter value at that point. When an error feedback signal 35 is received by the clear printstream unit 37 the clear printstream unit sends commands to clear the printer controller printstream upstream of the error point. If for example an error is detected in unit 6B the clear printstream unit will in response to signal 29 as propagated along general error feedback channel 35 clear all logical sheets and pages in both the sheet tracking unit and build sheet unit. The same would be true if an error was detected at unit 6C or 6D, but additionally the operator would have to manually clear the jammed sheets from the portion of the printstream upstream of the jam point in the printer engine 4. If, alternately, the error reported to the clear printstream unit 37 came from unit 6A via signal 17 and general error feedback 35 then only the logical pages in the build sheet unit 15 would be cleared. When an error is reported the counter values of all error detection units upstream of the reporting unit are decremented to equal the value of the reporting unit. This assures that counter values are corrected for discarded pages. Conversely this assures that counter values reflect pages still in the printer.

The sheet tracking error detection unit has another function as well. It also serves to allow for an operator recovery request. For example, an operator makes a back or forward X space request where X is the number of sheetsides to back or forward space. In response to a backspace or forward space request input at unit 39, a discard buffered data command is sent to the clear printstream unit of the printer controller (185). This command will cause the build sheet unit 6A and Sheet Tracking unit 6B to clear all logical sheets and pages upstream of unit 6B. The sheet tracking unit 6B then sends a response signal 29 along pathway 35 to the Print System Manager 2. The response signal contains the counter value of the committed page counter. The counter value of the error detection unit 6A is decremented to be equal to that of unit 6B. This assures that the counter value in the upstream area, in this case the counter of unit 6A, is corrected for the discarded pages. In the case of a backspace request; a backspace 2 request is interpreted to mean that reprinting of the two preceding sheet sides consisting of one or more pages per side is called for. In the case of a forwardspace request; a forwardspace 2 request is interpreted to mean the skipping of the current and following sheet sides and printing of the next following sheet sides consisting of one or more pages per sheet side.

Figure 4:
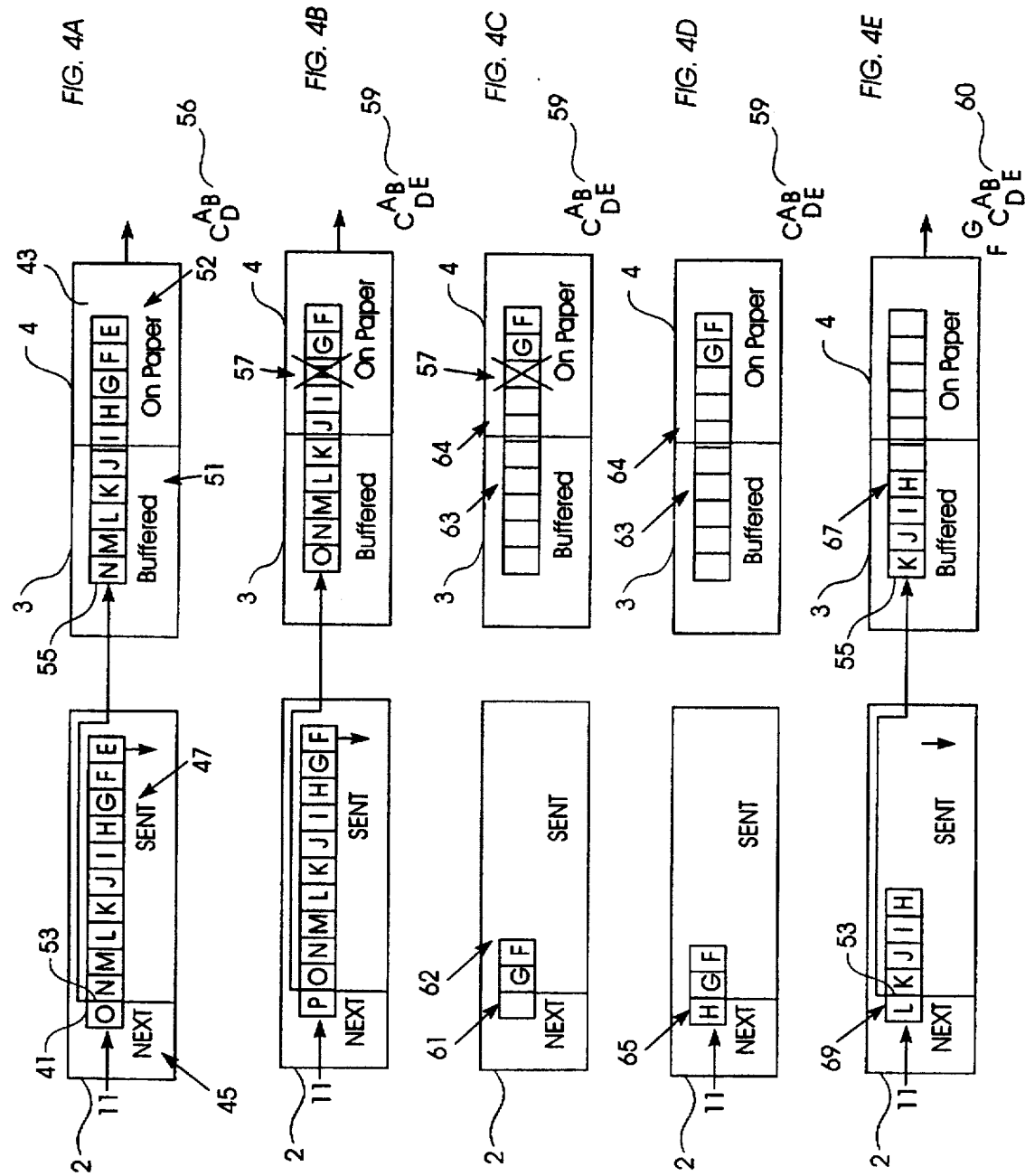
FIG. 4 A–E shows the error recovery process in the pending page queue of the print system manager and the printer queue of both the printer controller and printer engine.

FIG. 4 A–E show the page data flow in the pending page queue and printer queue during error recovery. FIG. 4A shows the process of error recovery in the pending page queue 41 and the printer queue 43. The pending page queue 41 is maintained within the print system manager 2. The pending page queue contains logical page representations, specifically electronically stored page identifiers as opposed to physical sheets.

The pending page queue 41 consists of two portions 45 and 47. Portion 47 consists of those pages which have been sent in order or sequence sent and portion 45 consists of the page next to be sent in order or sequence to be sent. New pages are added to the pending page queue 41 from the MO:DCA datastream 11. Point 53 marks the dividing line between the two portions of the pending page queue. Whichever page is at point 53 is the page next to be sent to the printer queue 43. As a page is sent from point 53 to point 55 of the printer queue 43, sheet side information is maintained in the sent page portion 47 of the pending page queue 41. For purposes of all drawings 4 A–E both the pending page queue and the printer queue are shift right queues.

A page is sent from point 53 in the pending page queue to input point 55 of the printer queue 43. The printer queue exists in both the printer controller 3 and the printer engine 4. That portion of the printer queue identified as the buffered page portion 51 exists in the printer controller 3 and consists of logical sheets, where each sheet may consist of one or more pages per sheet side. That portion of the printer queue identified as the on paper portion 52 exists in the printer engine 4 and consists of physical sheets, which have been reduced to ink and paper or other physical output mediums. The output from the printer queue 56 is then in the form of ink on paper or other physical mediums.

In FIG. 4B a new sheet has been output from the printer 59 and an error 57 is shown in the printer engine portion of the printer queue 43. The sheet marked "H" has been printed in error, perhaps indicating that an error in the form of a jam condition has been detected by one of the aforementioned error detection units.

FIG. 4C shows the immediate effect of error detection and subsequent notification by an error detection unit to the print system manager. Both the pending page queue 41 and the printer queue 43 are effected. Input to the pending page queue is terminated. The next to be printed portion 61 of the pending page queue is cleared. The sent portion 62 of the pending page queue is cleared up stream of the error point. The buffered page portion 63 of the printer queue is cleared and the paper jam upstream of the error point 57 is also cleared 64. Printing is momentarily halted.

FIG. 4D shows the next step in the error recovery process. Having determined the appropriate repositioning point the print system manager 2 summons page data 65 from the MO:DCA datastream 11. This new page data reinitializes the next portion 45 of the pending page queue.

Finally in FIG. 4E printing resumes. Newly printed sheets 60 are output from the printer engine 4. New pages are received at point 55 of the printer queue, entering the build sheet unit 15 of the printer controller 3 where they will be electronically placed on logical sheets. These new pages are sent from point 53 of the pending page queue. Initially these are the pages printed in error 67, subsequently these are the next pages to be printed 69 in the ordinary course of the job. Following now in FIGS. 5, 6A–6B, and 7A–7B is a more detailed view of the process of error recovery in the print system manager.

Figure 5:
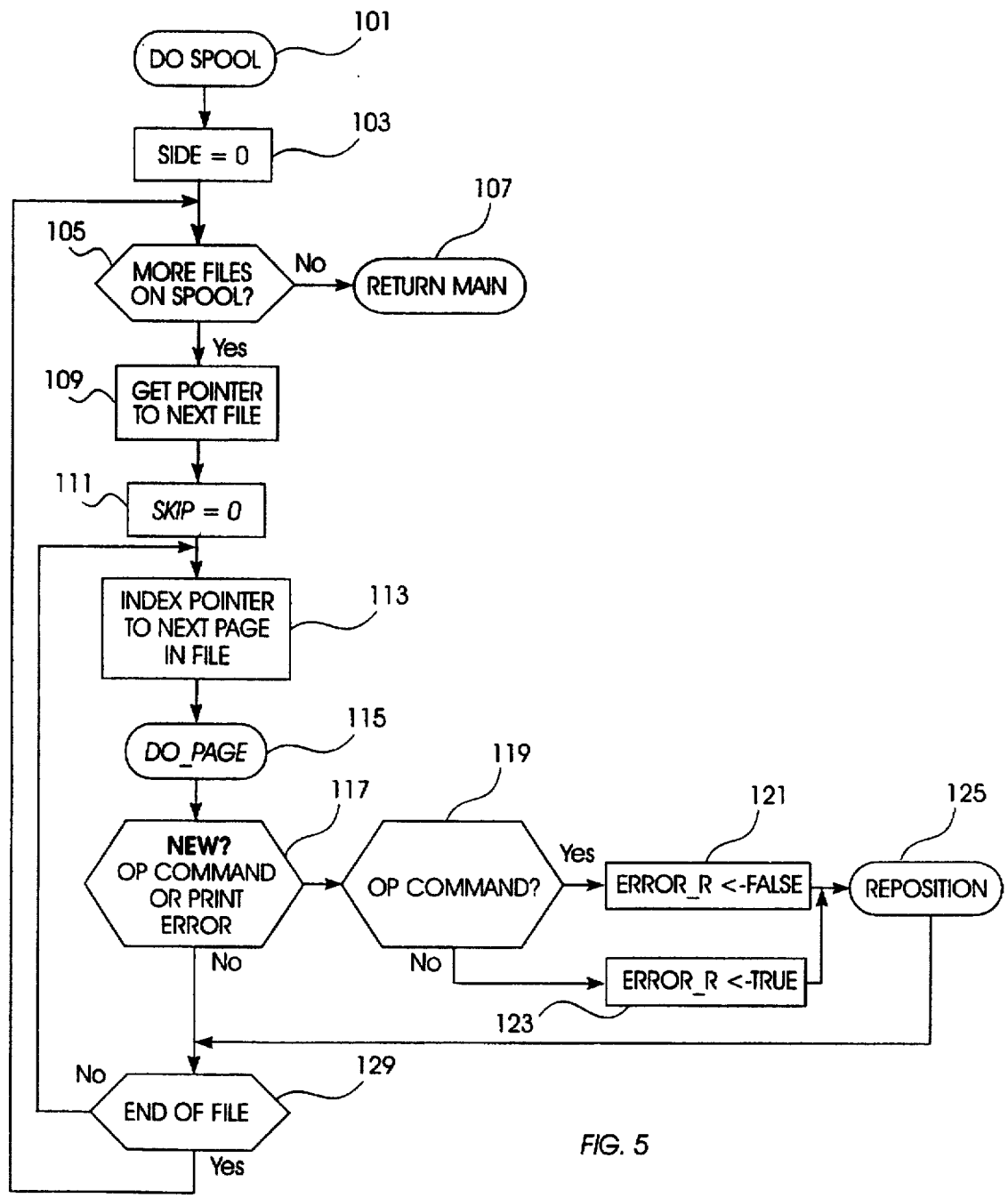
Figure 6A:
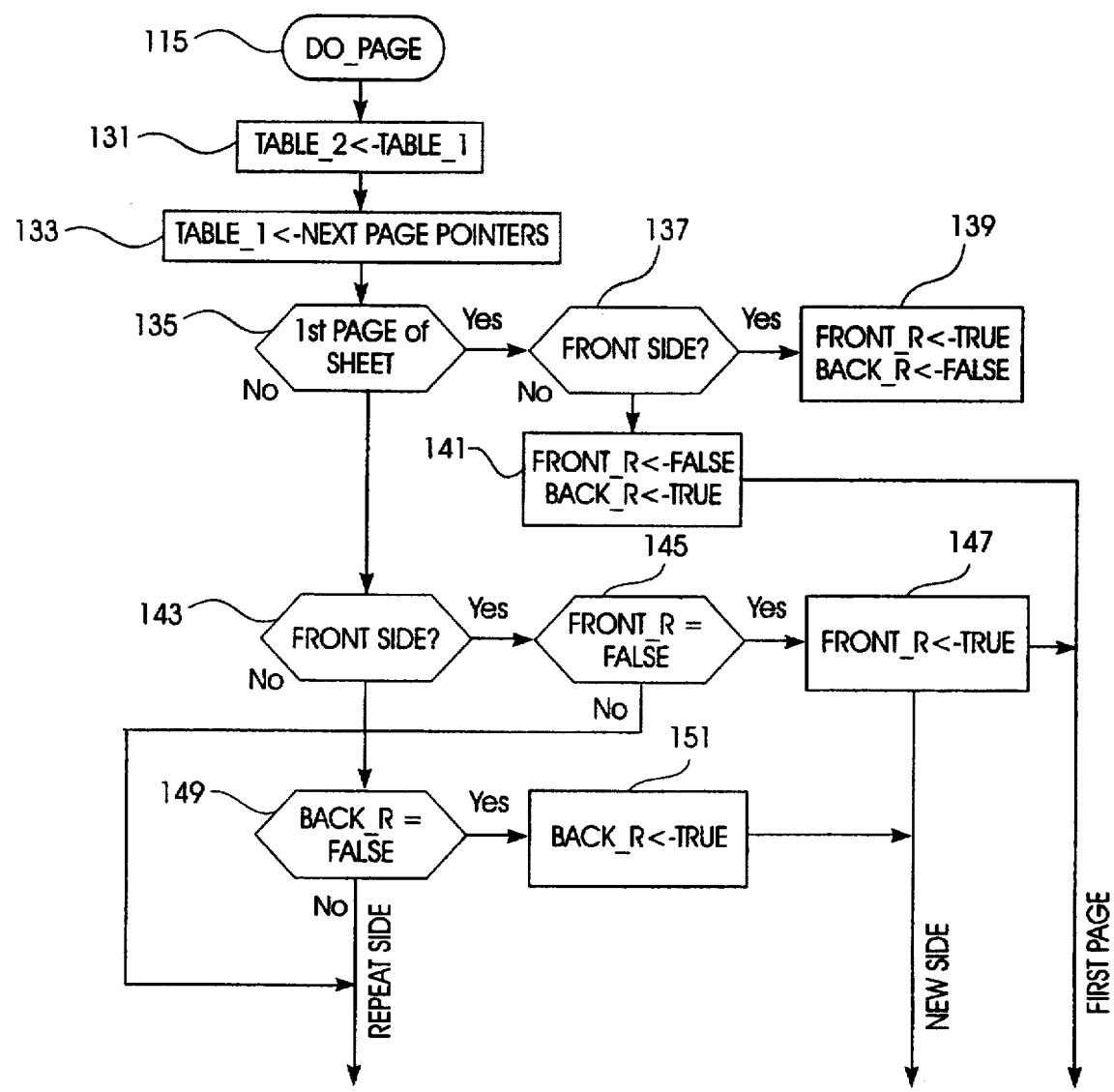
FIGS. 6A–6B shows in detail the processing in the print system manager connected with tagging pages within the MO:DCA files and sending those pages to both the pending page queue and the printer queue.
Figure 6B:
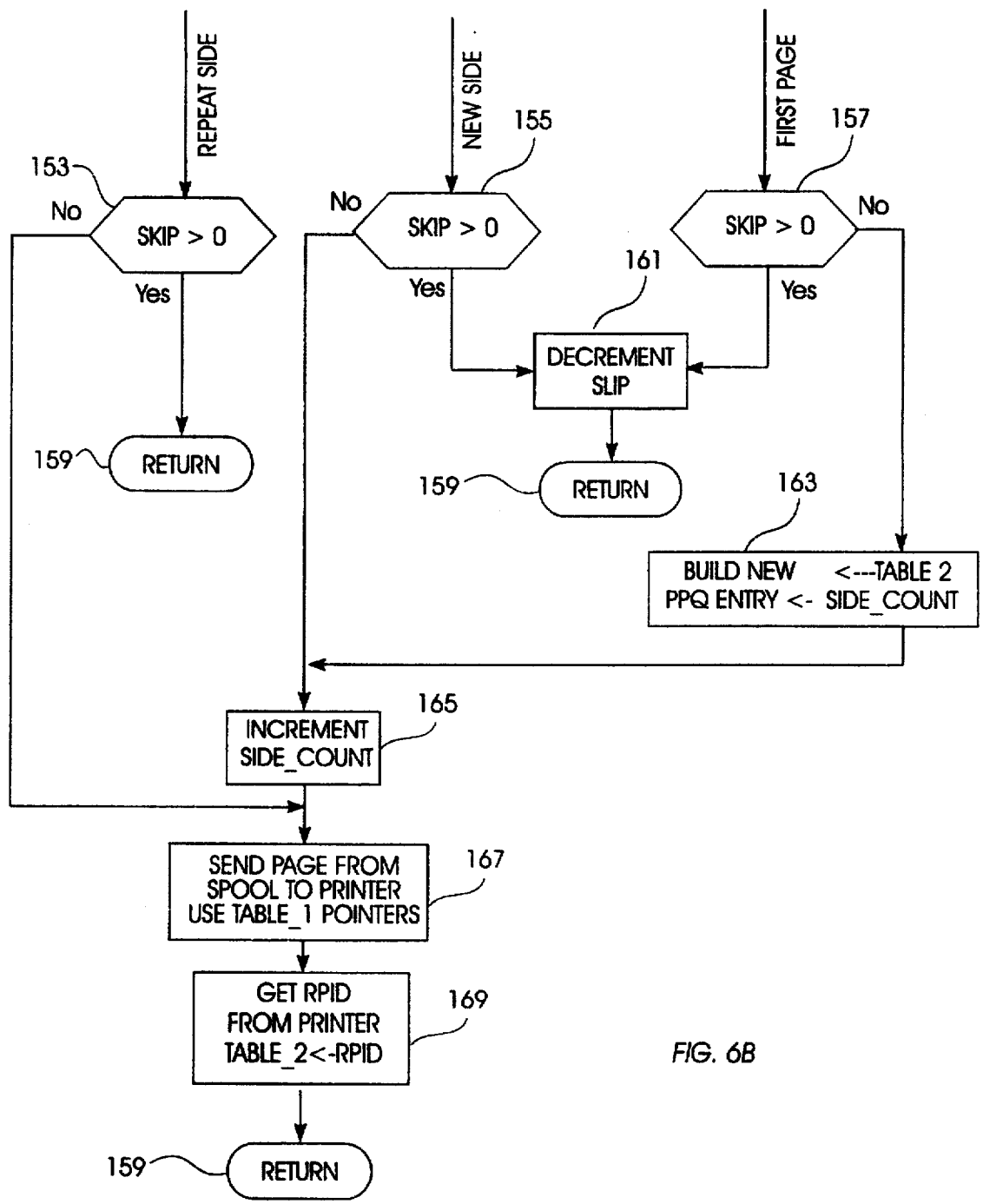
Figure 7A:
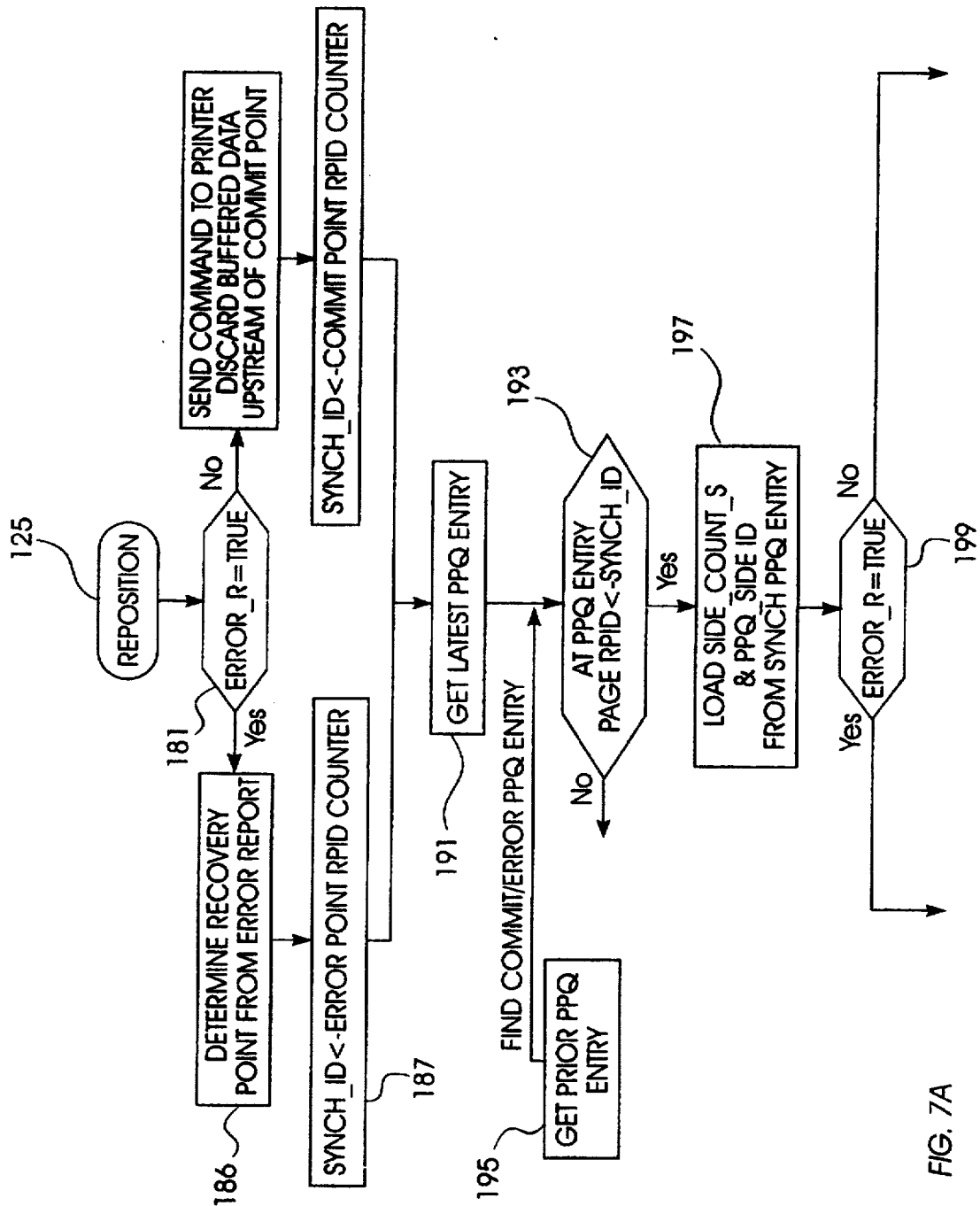
FIGS. 7A–7B shows the process for error recovery and for responding to operator backspace and forwardspace commands.
Figure 7B:
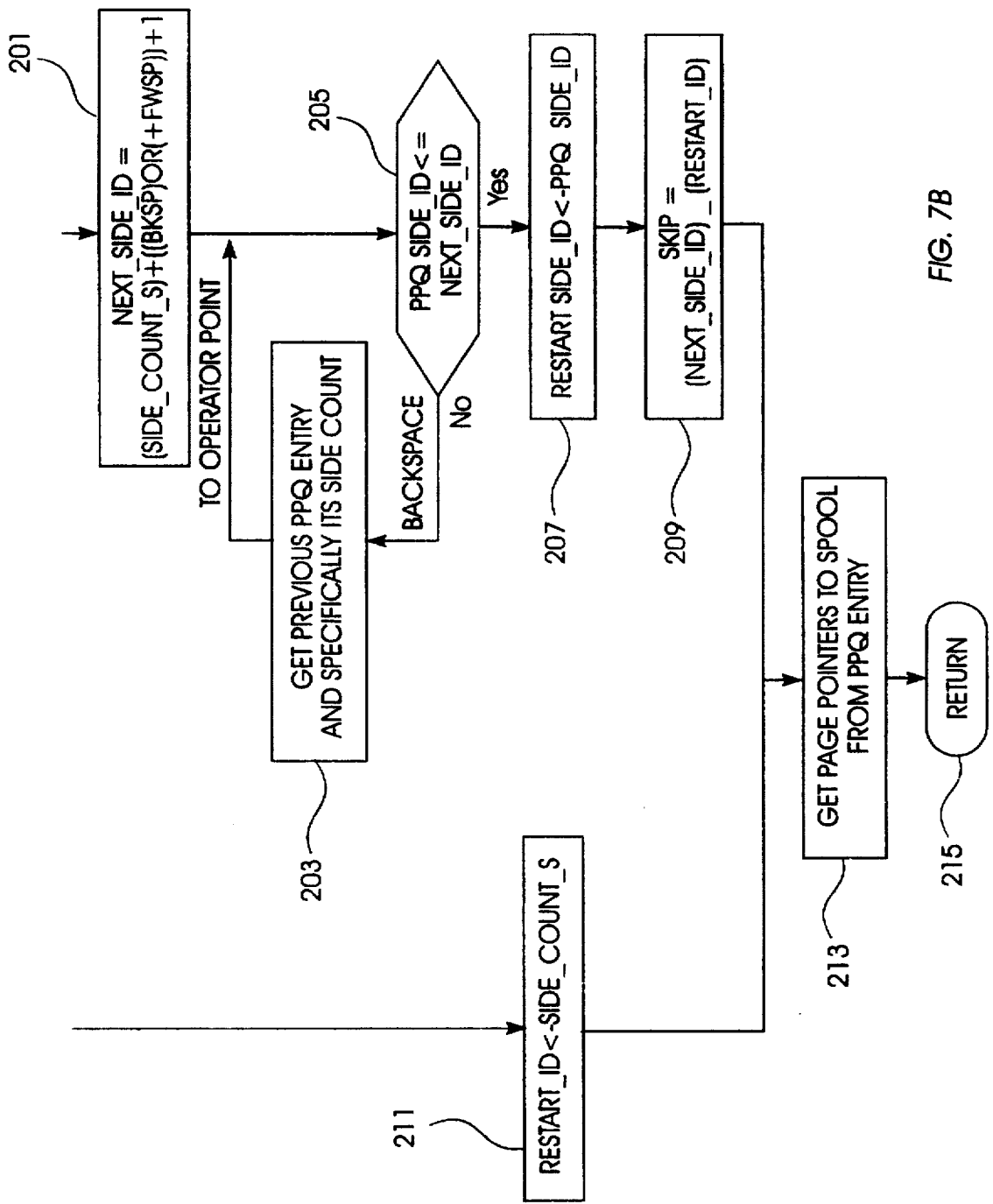

As shown in FIG. 5 the DO-SPOOL process generally represents the access protocol from the print system manager to the print spool for retrieving data and resource objects stored in MO:DCA files. Logical operation 103 initializes a variable register SIDE to a zero value. The first decision process 105 determines there are more files on the print spool. If there are no more files on the spool, then control returns to the main program 107. If there are more files on the spool, then in operation 109 that file is retrieved from the print spool. Next a variable register SKIP is set equal to zero in step 111. Within a file, the pointers to the next page of data and accompanying resource objects are obtained in logical process 113. Having fetched the page and resource pointers, control passes to a DO_PAGE subroutine in logical process 115.

The DO_PAGE subroutine generally represents the processing in the print system manager connected with maintaining a pending page queue and sending pages from that queue to the printer queue. Not all pages sent to the DO_PAGE subroutine will be added to the queue or sent to the printer queue. During repositioning, to be discussed shortly, some of the pages sent to the DO_PAGE subroutine will be skipped until the appropriate repositioning point has been reached, at which point, queue building and page sending to the printer queue will resume. After returning from the DO_PAGE subroutine, decision operation 117 determines if there has been a operator generated repositioning request in the form of a backspace or forward space command or if the printer controller, print engine, or post process controller, has generated an error. If any of these events took place, then error recovery is required. If any stacking of error or operator recovery requests is required, until for example completion of a prior repositioning or recovery request, this process step 117 would be the step in which that stacking is handled.

In decision process 119 the type of recovery is determined. If an operator request in the form of a backspace or forwardspace is called for, then process control passes to operation 121 in which a register ERROR_R is initialized to logical false. If, alternately, in decision step 119 it is determined that an error recovery rather than an operator command is being processed, then control passes to step 123 in which register ERROR_R is initialized to logical true. In either case after either steps 121 or 123, process control passes to a logical process 125 for repositioning.

The REPOSITION process is generally responsible for error recovery and for responding to operator backspace and forwardspace commands. Upon return from the REPOSITION subroutine, control passes to process 129. Whether or not there has been an error recovery request that has been processed in the REPOSITION subroutine, control returns to decision operation 129. A determination is made as to whether the end of the file has been reached. If end of file has not been reached, then control returns to step 113 to fetch the pointers to data and resource objects on the print spool for the next page to print. Alternately, if there are no more pages in the file, control returns to process 105 for a determination of the presence of any more files on the Print Spool.

As mentioned above and as shown in FIGS. 6A–6B the DO_PAGE subroutine has two functions: first, to maintain the Pending Page Queue (PPQ); and second, to determine which page entries in the PPQ will be utilized to locate actual page data on the print spool to be sent directly to the printer controller. The subroutine 115 begins at operation 13 1 in which that portion of page environment data consisting of pointers associated with a single page on the print spool and stored in buffer TABLE_1 is copied to a buffer TABLE_2. Subsequently in process 133 pointers associated with the next page as determined in process 113 are placed in the buffer TABLE_1.

The next set of operations or processes 135–151 in the DO-PAGE subroutine categorize the page in one of three groups. A page is either the first page on a given sheet, the first page on the side opposite the side on which the first page appeared, or a second or subsequent page on either sheet side. As will be shown, the subsequent processing accorded each of these three groups differs. In decision process 135 the next page as determined in operation 113 is analyzed to determine if it is the first page of a sheet.

If a page is the first page of a sheet then in decision step 137 the sheet side assignment, either front or back, of the page is determined. If the page is destined for placement on the frontside of a sheet, then in step 139 register FRONT_R is loaded with a value of logical true and register BACK_R is loaded with a value of logical false. Conversely, if in decision process 137 it is determined that the page is destined for placement on the backside of a sheet, then in step 141 register FRONT_R is loaded with a value of logical false and register BACK_R is loaded with a value of logical true. In either event process control proceeds to decision operation 157.

If a page is not a first page of a sheet, then control passes from decision 135 to decision process 143. Operation 143 tests whether the page is tagged for placement on the front side of a sheet. If the page is to be placed on the front side of a sheet,then in decision process 145 the register FRONT_R is checked to see if it is logical false. If the register is logical false indicating that no page processed to this point in conjunction with a given sheet is indicated for placement on the front side of the sheet, then in operation 147 the register FRONT_R is loaded with the value of logical true. If, alternately, in decision process 145 the register FRONT_R is logical true indicating that the page being analyzed is not the first one to be specified for frontside placement on this sheet, then control proceeds to decision process 153.

If the page being analyzed is not frontside then it must be backside and in decision step 149 the register BACK_R is tested for a logical false condition. If that condition exists, then the page being analyzed is the first page associated with the backside of the instant sheet. Operation 151 sets the register BACK_R to the value of logical true indicating that a backside page has been processed. Subsequently control passes to decision process 155. If in decision 149 the register BACK_R is determined to be logical true, then a page which is at least the second to be placed on the backside of a given sheet is being processed in which event control passes to decision process 153.

At decision steps 157, 155, and 153, the first page on a given sheet, the first page on the side opposite the side on which the first page appeared, or a second or subsequent page on either sheet side are respectively being processed. As described hereinafter, separate processing is accorded each of these three groups.

In the first instance decision step 157 is presented with the first page on a sheet and if the value of a variable register SKIP is non-zero then control passes to process 161 which decrements the register SKIP and returns 159 control to decision 117 of the DO_SPOOL routine. A non-zero value in the register SKIP indicates that repositioning is still taking place. Only when SKIP is not greater than zero will forwardspace repositioning have been completed. At that point pages subsequently processed will be sent to the printer. The first page processed by the DO_PAGE subroutine, after SKIP reaches zero will be the first page associated with the particular sheet side at which error or operator recovery will begin. The SKIP register and its relationship to this preferred embodiment of the invention will be described in subsequent discussion in connection with the REPOSITION subroutine.

If alternately, the value of SKIP is determined in process 157 to be null, then in process 163 the counter value, the Received Page ID ("RPID"), of the build sheet error recovery unit 6A, is retrieved. This value is the count associated with the last page received by the Printer Controller. In process 163 a new PPQ entry, not for the instant page, but rather for the prior processed page, is added to the PPQ. Note that the only PPQ entries that are being built are for the last page, in queue order, associated with a given sheet. The information associated with this PPQ entry, which is the last page in queue order associated with the former sheet, consists of: the pointers to print spool page objects both data and resource, as well as the current value of the register SIDE_COUNT, and the RPID value retrieved in the prior pass through the DO_PAGE sub routine in process 169. Control then passes to process 165 wherein the value in the SIDE_COUNT register is incremented reflecting the processing of a new page on a new sheet side. Note that the latest entry in the PPQ pertains, not to the current page, but rather the last page processed prior to the current page. Subsequent control passes to process 167 for summoning page and resource data from the print spool by means of the pointers in TABLE_1, and sending that page to the printer controller. After summoning a page from the print spool and sending it to the printer controller the value of the RPID counter of the build sheet error detection unit 6A, up increments. In process step 169 the RPID value of error detection unit 6A is loaded into TABLE_2. Finally in step 159 control returns to DO_SPOOL and specifically step 117 of that process which is the error detection routine.

In the second instance decision step 155 is presented with the first page on the side opposite the side on which the first page appeared. If the value of a variable register SKIP is non-zero, then control passes to process 161 which decrements the register SKIP and returns 159 control to decision 117 of the DO_SPOOL routine. If alternately, the value of SKIP is determined in process 155 to be null, then in step 165 the value in the SIDE_COUNT register is incremented reflecting the processing of a new page on a new sheet side. Subsequently, process control passes to operation 167 for summoning page and resource data from the print spool by means of the pointers in TABLE_1, and for sending that page to the printer controller. When the page is received by the printer controller the value of the RPID counter of the build sheet error detection unit 6A, up increments. In process step 169 the RPID value of error detection unit 6A is loaded into TABLE_2. Finally in step 159 control returns to DO_SPOOL and specifically step 117 of that process which is the error detection routine.

In the third instance decision step 153 is a second or subsequent page on either sheet side being processed. If the value of SKIP is non-zero, then control returns 159 to decision 117 of the DO_SPOOL routine. If alternately, the value of SKIP is determined in step 153 to be null, then control passes to process 167 for summoning page and resource data from the print spool by means of the pointers in TABLE_1, and for sending that page to the printer controller. When the page is received by the printer controller the value of the RPID counter of the build sheet error detection unit 6A, up increments. In process step 169 the RPID value of error detection unit 6A is loaded into TABLE_2. Finally in step 159 control returns to DO_SPOOL and specifically step 117 of that process which is the error detection routine.

As mentioned above and as shown in FIGS. 7A–7B the REPOSITION subroutine has two functions: first, error recovery; and second, responding to operator backspace and forward space commands. Both functions share similar features, specifically, determining the point in the PQ and PPQ at which the error recovery or operator request took place, clearing both queues upstream of point, resetting page pointers to the print spool, restoring both queues, and continuing with the print process.

The subroutine 125 begins at decision process 181 in which a register ERROR_R is checked for a logical true condition. If that condition is detected, the repositioning operation taking place is for error recovery rather than in response to an operator backspace or forwardspace command. Error notification could come from a jam point 57 (FIG. 4B, 4C) in the printer engine 4 or an error point in the printer controller 3. Control then passes to process 186 in which the JAMID counter value is determined from the error information received from the error detection unit. Then in process 187 the value of the JAMID counter is loaded into a register SYNCH_ID. This counter value will, as described in the following, be used to find the location corresponding to the actual PQ jam point in the PPQ. Subsequently, control passes to process 191 to be discussed shortly.

If alternately, decision process 181 finds a logical FALSE value in register ERROR_R, then an operator backspace or forwardspace command is being processed. The operator backspace or forwardspace request would be processed relative to the committed sheet point, error detection unit 6B in the sheet tracking unit 25, of the printer controller 3. Control passes to process 185 in which a command is sent from the print system manager to the printer controller 3 to discard all buffered data upstream of the commit point. This step 185 prepares the print queue upstream area which will subsequently be filled with those sheets requested by the operators back or forward space command, followed by those sheets constituting the remainder of the document. Control then passes to process 189 in which the value of the commit point counter is loaded into a register SYNCH_ID. This counter value will, as described in the following, be used to find the location corresponding to the actual PQ commit point in the PPQ. Subsequently, control passes to operation 191 to fetch the latest PPQ entry.

The process steps 191-197 are related to incrementing through the PPQ in last in to first in order until the PPQ entry is found in which the Page ID corresponds to the SYNCH_ID. This condition assures that a point in the PPQ has been reached which corresponds to the jam or commit point as determined above. From process 191 control passes to decision process 193 in which the magnitude of the RPID tag associated with the selected PPQ entry and the value in register SYNCH_ID are compared. If the RPID tag associated with the PPQ entry is not less than or equal to the SYNCH_ID, then the appropriate PPQ entry, corresponding to the jam or commit point in the PQ has not been found. In process 195 the prior PPQ entry is fetched, and control loops back to process 193 for continued comparison. When the PPQ has been traversed in the above described manner to a point at which page RPID is less than or equal to SYNCH_ID, then control passes to process 197. The value of the side count tag associated with the PPQ entry which meets the exit condition of process 193 is fetched by process 197 and placed in registers SIDE_COUNT_S and PPQ_SIDE_ID. The PPQ entry that corresponds to the exit condition from the traversal loop formed by process 193 and 195 will be the last page of the last sheet processed before the error or operator command. This page will then always be downstream of either the jam or commit point. This ensures that when repositioning has been completed printing will resume with the correct page to sheet positioning.

Control is then passed to decision process 199 in which the value of register ERROR_R is tested for logical true or false. If a logical true is detected, indicating that an error recovery rather than an operator command is the source of the reposition request, then control passes to step 211. Step 211 loads the value of SIDE_COUNT_S into a register RESTART_ID. Then in operation 213 the page pointers associated with PPQ entry having a sidecount value equal to that stored in the register RESTART_ID are fetched. These are the pointers associated with the last page of the last sheet printed correctly. In other words when in step 215 control is returned to the DO_SPOOL process, any pointer indexing appropriate to step 113 of the DO_SPOOL process will send to the DO_PAGE process the first page of the sheet which was printed in error.

If alternately, process 199 results in a determination that the register ERROR_R is logical false indicating that an operator backspace or forwardspace request is being made, then operation 201 initializes a register NEXT_SIDE_ID. The convention that determines the value to initialize this register is that backspace or forwardspace commands are interpreted in terms of sheet side rather than page. The register NEXT_SIDE_ID is set equal to the sum of the value of register SIDE_COUNT_S, plus 1, plus or minus the number of forwardspaces or backspaces respectively. A backspace is treated negatively because it represents a request for an earlier PPQ entry that has passed downstream of the commit point which was located in steps 193–197 discussed above. All positioning is relative to sheet side rather than page. Furthermore, since the only PPQ entries that exist are those for the last sheetside associated with a given sheet, page and sheetside integrity is maintained throughout the repositioning process. The process step 197 loaded SIDE_COUNT_S with the value of the last page of the last sheet downstream of the commit point. Process 201 then identifies, in the case of a backspace command, a sidecount value further downstream at a PPQ entry whose sidecount identifies it as the last page of the sheet prior to the reposition point. In the case of a single backspace the value of register NEXT_SIDE_ID would be equal to SIDE_COUNT_S indicating that the sheet to be reprinted is the sheet just upstream of the one identified by SIDE_COUNT_S.

In the case of either a backspace or forwardspace command control passes from process 201 to a loop comprising steps 205 and 203. The loop 203–205 traverses the PPQ in only one direction, last in to first in starting at the synch PPQ entry identified in process 197 as having a sidecount equivalent to the value in the register PPQ_SIDE_ID. If a forwardspace request is being processed, the loop is exited immediately without queue traversal and control passes directly from step 205 to step 207. This can best be seen by realizing that the decision process 205 has as an exit condition that the requirement that NEXT_SIDE_ID be greater than or equal to PPQ_SIDE_ID. This condition is fulfilled on entry to step 205, in the case of a forwardspace, since PPQ_SIDE_ID is initially equal to SIDE_COUNT_S and is therefore necessarily less than NEXT_SIDE_ID which is greater than SIDE_COUNT_S by an amount equal to the number of forwardspaces plus one. In step 207 a register RESTART_ID is loaded with the value of the sidecount associated with the PPQ entry located in loop 203–205. In the case of a forwardspace command this is the same PPQ entry associated with the process 197. Subsequently in step 209 a decrementable register SKIP is loaded with a value equal to the difference between the value of NEXT_SIDE_ID and the sidecount of the PPQ entry located in step 205. In the case of a forwardspace command the non-trivial value of SKIP indicates the number of sheetsides to skip before reinitializing the PQ entries upstream of the commit point.

Alternately, in the case of a backspace command the value of NEXT_SIDE_ID as determined in step 201 will be less than or equal to the PPQ entry identified in step 197 as having a sidecount value equivalent to that of register PPQ_SIDE_ID. Therefore, initially process 205 will pass control to process 203 which seeks the prior PPQ entry and obtains its sidecount and loads that sidecount into register PPQ_SIDE_ID. Control returns to step 205 to determine if that sidecount has a value less than NEXT_SIDE_ID. In the case of a backspace one command, it will. In any event backspace processing requires as a condition of exiting the loop that process 205 be satisfied.

At exit from process 205 an entry in the PPQ has been identified as the restart point. The restart point defined as the last page of the last sheet prior to the backspace request. The page subsequent, in queue order, to that page will be the first page of the sheet sent to the area upstream of the commit point to reinitialize it. Therefore in step 207 register RESTART_ID is loaded with the value of PPQ_SIDE_ID. Subsequently in process 209 register SKIP is loaded with the difference of registers NEXT_SIDE_ID and RESTART_ID which in the case of a backspace command is zero since loop 203–205 located the correct repositioning point for backspace commands. Finally in step 213 the pointers from the restart point, as identified at the PPQ entry having a sidecount equivalent to RESTART_ID, are obtained and control returns in process 215 to step 129 for a determination of end of file condition.

The invention has been described in detail above by making reference to preferred embodiments thereof. However, it is known that those skilled in the art will, upon reading this detailed description, readily visualize yet other embodiments that are within the spirit and scope of this invention. Thus, it is intended that the above detailed description not be taken as a limitation on the spirit and scope of the invention.

GLOSSARY OF TERMS

The following terminology is introduced in connection with FIG. 1.

The term Archive File and Print Spool refer to that system component which accepts and stores page description and page format data by document and by job for subsequent retrieval and presentation.

The term Error Recovery refers to the ability of a printer to detect errors, to clear the PQ upstream of the error point, to reprint those sheets determined to have been printed in error, and to resume normal operation after error detection and correction.

The term Logical Page refers to a two dimensionally electronically mapped representation of a page of data.

The term Logical Sheet refers to a two dimensionally electronically mapped collection of page data which are electronically mapped into explicit positions on a single medium consisting of front and back side.

The term Pending Page Queue (PPQ) refers to the queue of page environment data maintained by the Print System Manager. The PPQ mirrors the actual last page associated with each sheet, both logical and committed in the order in which the sheets are being processed in the Printer Controller and the Print Engine. This queue is continually updated with page environment information for the last page associated with each sheet, as that page is sent from the print spool to the Printer Controller.

The term Print System Manager refers to that system component which transforms data and resource objects stored on the print spool into a format suitable for a specific printer and which in addition manages and controls the printer. The print system manager is then the system component which transforms a MO:DCA datastream to an IPDS datastream.

The term Printer Queue (PQ) refers to the queue of logical and committed sheets of page data that exists in the Printer Controller and the Printer Engine.

The following terminology is introduced in connection with FIG. 2.

The term Datastream refers to the flow from print spool through print system manager, printer controller, and print engine of page and or sheet data whether electronically or physically categorized.

The term Error Detection Unit refers to a set of the following three subunits; an Error Sensor, a Counter, and a Transmission subunit.

The term Error Sensor refers to any combination of electrical, optical, or mechanical sensors; which are appropriate for sensing errors in the portion of the printer in which they are placed. In most portions of the printer controller where page data is being handled electronically or computationally the Error Sensor would electronically or computationally sense those errors. In the print engine where sheet data is being handled electronically and mechanically the error sensor would be electronic, optical, or mechanical.

The term Counter refers to the subunit of the Error Detection Unit which when placed at a given point in the printer controller, print engine, or post process unit records the passage of each page or sheet. The counter up increments with the passage of each page or sheet.

The term Transmit Error subunit refers to the subunit which transmits Error Detection Unit location identification and Counter value to the Print System Manager.

The following terminology is introduced in connection with FIG. 3.

The term Build Sheet refers to that system component in the printer controller which buffers logical page data received from the print system manager and which then places those buffered logical pages in bit mapped format in the appropriate position on a logical sheet, which sheet is then downloaded to the printer engine which prints a physical sheet.

The term Committed Sheet refers to a logical sheet which has entered the print engine 4 and which therefore has been physically printed on paper.

The term Logical Sheet Builder refers to that system component which buffers logical page data received from the print system manager 2 and which then places those buffered logical pages in bit mapped format in the appropriate position on a logical sheet, which sheet is then downloaded to the print engine 4 to form an actual sheet.

The term Page Environment refers to that page specific information which is retained by the Print System Manager 2. Each PPQ entry contains page environment data as opposed to actual page data. Page environment data consists of four variables. First, pointers to page data within each MO:DCA file stored on the Print Spool. Second, a side count value which ranks sides in order of appearance in the print stream and categorizes individual pages within the print stream in terms of their relationship to a specific sheet side. Third, a tag indicating whether a page is on the frontside or backside of a given sheet. Fourth, a tag indicating which RPID value is associated with a given page. In contrast to the former three variables this latter one may change as the position of a given page in the PPQ changes during error recovery or in response to forward or backspace commands.

The term Received Page ID (RPID) refers to the value of the counter subunit of the build sheet error detection unit 6A. This counter subunit up increments as each page is received by the Build Sheet unit 15 from the Print System Manager 2.

The term Side Count ID refers to the value of a counter in the Print System Manager 2 which counter up increments not on a page by page basis but rather on a side by side basis. Therefore when the first page to be positioned on a side of a logical sheet is sent from the Print System Manager 2 to the Printer Controller 3 the side counter up increments. When the second page to be positioned on the same side of a logical sheet is sent from the Print System Manager to the Printer Controller the side count does not increment.

What is claimed is:

1. A method for error recovery, for an advanced function printer having a print system manager, a printer controller, a printer engine, and a plurality of page images stored in a print spool which pages are processed in a continuous print datastream in said printer controller and printer engine, said method comprising the steps of:

storing in document order a plurality of pages in a print spool;

fetching in document order a plurality of pages from said print spool to provide fetched pages;

maintaining a page record of each of fetched pages wherein each of said page records contains information as to the document order in which each page is fetched from said print spool;

tagging each page record with a sheetside identifier indicating whether the fetched page is to be printed on the front or back of a print sheet;

sending in document order said fetched pages into said continuous print datastream;

detecting an error page at one or more locations in the printer controller and print engine;

notifying said print system manager of said error page and the location at which said error occurred;

correlating the error page and location with one or more of said maintained page records including the sheetside identifier to provide correlated page records whereby said correlated page records are identified as page records of pages to be recovered;

interrupting said sending step and resending pages corresponding to said correlated page records into said continuous print datastream; and resuming sending in document order said fetched pages into said continuous print datastream.

2. A method according to claim 1 wherein:

the step of correlating includes the step of adding to said correlated page records all page records having a sheetside identifier indicating a page is on the same sheetside with another correlated page record.

3. A method for print operation recovery in an advanced function printer having a print system manager, a printer controller, a printer engine, and a plurality of page images stored in a print spool which pages are processed in a continuous print datastream in said printer controller and printer engine, said method comprising the steps of:

storing in document order a plurality of pages in a print spool;

fetching in document order a plurality of pages from said print spool to provide fetched pages;

maintaining a page record of each of said fetched pages wherein each of said page records contains information as to the document order in which each page is fetched from said print spool;

tagging each page record with a print sheetside identifier to create a tagged page record, each print sheetside containing a plurality of pages;

sending in document order said fetched pages into said continuous print datastream;

detecting an operator recovery request, said recovery request including an operator backspace or forward-space request for a number of print sheetsides;

notifying said print system manager of said recovery request;

correlating the number of print sheetsides in said recovery request with said tagged page records whereby tagged page records correlated with said recovery request are identified as recovery page records required for recovery;

interrupting said sending step and resending pages corresponding to said recovery page records into said continuous print datastream; and resuming sending in document order said fetched pages into said continuous print datastream.

4. A method according to claim 3 wherein:

said correlating step includes the step of adding to said recovery page records all page records having a sheetside identifier indicating a page is on a same sheetside with a page of another recovery page record.

5. A method according to claim 4 wherein the step of detecting an operator recovery request includes a step of interpreting the number of sheetsides requested for recovery.

* * * * *